J. B. DUNLAP.
PULLEY.
APPLICATION FILED OCT. 28, 1916.
1,219,382.
Patented Mar. 13, 1917.
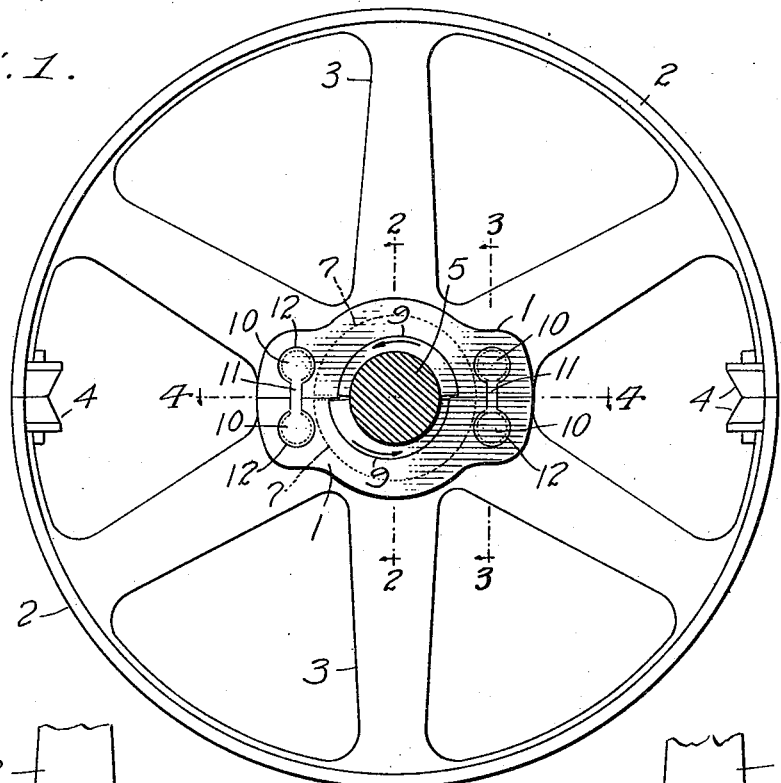
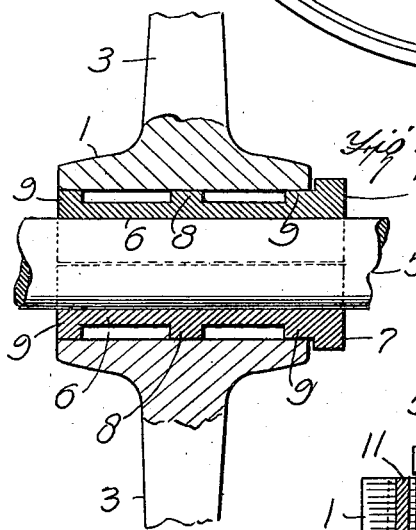
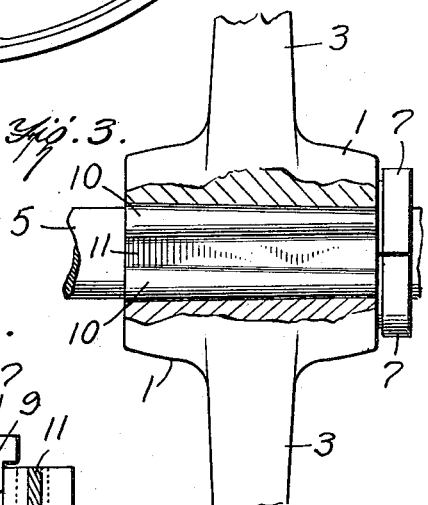
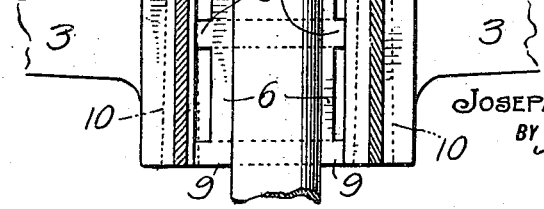
WITNESSES
INVENTOR
Joseph B. Dunlap,
BY
ATTORNEYS

UNITED STATES PATENT OFFICE.

JOSEPH B. DUNLAP, OF TULSA, OKLAHOMA.

PULLEY.

1,219,382.   Specification of Letters Patent.   Patented Mar. 13, 1917.

Application filed October 28, 1916. Serial No. 128,198.

*To all whom it may concern:*

Be it known that I, JOSEPH B. DUNLAP, a citizen of the United States, and a resident of Tulsa, in the county of Tulsa and State of Oklahoma, have invented a certain new and useful Improvement in Pulleys, of which the following is a specification.

My invention is an improvement in pulleys, and has for its object to provide a pulley of the sectional type wherein a new and improved form of connecting means is provided for connecting the sections, and a new and improved form of bushing for tightening the pulley on the shaft controlled by the turning of the bushing with respect to the pulley.

In the drawings:

Figure 1 is a side view of the improved pulley, and

Figs. 2, 3, 4, are sections on the lines 2—2, 3—3, and 4—4 respectively of Fig. 1, looking in the direction of the arrows adjacent to the line.

In the present embodiment of the invention, a pulley consisting of similar sections is shown, each section having a hub portion 1, a rim portion 2, and spokes 3 connecting the hub and the rim portions, and the rim portions are connected at their ends by a mechanism indicated generally at 4 and which may be of any usual or desired construction.

The pulley is arranged upon a bushing which encircles a shaft 5, and the said bushing consists of similar sections, each of which is approximately semi-cylindrical and the sections fit the shaft closely. Each bushing is provided at one end with a marginal flange 7 and each bushing is provided on its peripheral surface with a central rib 8 and lateral ribs 9, the rib 9 adjacent to the flange 7 merging with the said flange.

Each bushing section is eccentric so far as its peripheral portion is concerned, that is, each section is thicker at one side edge than at the other, and gradually tapers from the thick edge toward the thin edge, and the sections are arranged with the thick edge of one section adjacent to the thin edge of the other.

The flanges of the bushing sections extend beyond the end of the hub portion and the interior of the hub portions of the pulley sections are shaped to fit the bushings. These hub portions are connected by double dowel pins shown in Figs. 1 and 3. Each of the said pins consists of two approximately cylindrical or rounded portions 10 connected by an integral web 11, and the said portions 10 are tapered. The web portion 11 of each dowel pin is of greater width at the smaller ends of the rounded portions than at the larger ends.

The hub portions are recessed on their abutting faces, as indicated at 12, in such manner that when the wheel sections are placed together in the position of Fig. 1, the recesses will register to receive the dowel pin, and the dowel pin is arranged at each side of the shaft. These recesses taper to fit the pins, and it will be obvious that the farther the pins are driven into the recesses the more tightly the wheel sections will be drawn toward each other.

In use, the ribs on the bushing are for the purpose of lessening the surface of the bushing coming in contact with the bore of the hub so that when the wheel rotates forward it will slip more easily, on the lesser bearing surface, causing the pulley to wedge on the shaft. The wheel sections may be tightly clamped upon the bushing sections by turning the bushing sections with respect to the wheel sections in the directions indicated by the arrows in Fig. 1. When so turned it will be obvious that the passage of the thicker portions of the bushing sections into the thinner portions of the coring of the hub will tend to wedge the wheel on the shaft and on the bushing.

I claim:—

A sectional pulley embodying rim and hub sections, the rim sections having securing means at their ends, and the hub sections being provided with transversely arranged tapered openings, and registering passages in communication with the tapered openings, the bore face of each hub section being of eccentric formation, dowels connecting the hub sections, each of the dowels comprising two tapered members to fit the said tapered openings, and a connecting web to enter the registering passages and a sectional bushing fitting the bore of the hub and adapted to secure the pulley upon a shaft, said bushing comprising circumferentially tapered sections flanged at one end and provided with exterior circumferentially arranged ribs.

JOSEPH B. DUNLAP.

Witnesses:
JNO. W. CUNNINGHAM,
J. A. WILSON.